(12) United States Patent
Hansen et al.

(10) Patent No.: US 6,195,427 B1
(45) Date of Patent: Feb. 27, 2001

(54) METHOD AND SYSTEM FOR DETECTING THE STATE OF DIALING A CODENUMBER

(75) Inventors: Flemming Hansen, Greve (DK); Sara Bern, Düsseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/134,912

(22) Filed: Aug. 17, 1998

(30) Foreign Application Priority Data

Aug. 18, 1997 (EP) .................................................. 97114256

(51) Int. Cl.[7] ....................................................... H04Q 3/42
(52) U.S. Cl. ................................................................ 379/352
(58) Field of Search .................................... 379/352, 354, 379/355, 201, 207, 229; 455/564

(56) References Cited

U.S. PATENT DOCUMENTS

| | | | |
|---|---|---|---|
| 4,658,096 | 4/1987 | West, Jr. et al. | 379/59 |
| 5,327,489 | * 7/1994 | Anderson et al. | 379/207 |
| 5,329,582 | * 7/1994 | Bogart et al. | 379/201 |
| 5,887,259 | * 3/1999 | Zicker et al. | 455/434 |
| 5,953,676 | * 9/1999 | Berry et al. | 455/564 |
| 6,021,335 | * 2/2000 | Zicker et al. | 455/564 |
| 6,028,924 | * 2/2000 | Ram et al. | 379/229 |

FOREIGN PATENT DOCUMENTS

| | | |
|---|---|---|
| 0 248 190 A3 | 12/1987 | (EP) . |
| 0 540 253 A2 | 5/1993 | (EP) . |
| 0 540 253 A3 | 5/1993 | (EP) . |
| 0 547 780 A2 | 6/1993 | (EP) . |
| 0 700 222 A2 | 3/1996 | (EP) . |
| 97/35445 | 9/1997 | (WO) . |

OTHER PUBLICATIONS

PCT International European Search Report, Jan. 29, 1998.
Sadao Obana et al., "Applicability of OSI Directory to Universal Personal Telecommunication (UPT)", Electronics and Communications in Japan, pp. 1–14, Oct. 1992.

* cited by examiner

Primary Examiner—David R. Hudspeth
Assistant Examiner—Susan Wieland
(74) Attorney, Agent, or Firm—Burns, Doane, Swecker & Mathis, L.L.P.

(57) ABSTRACT

In a method for detecting the state of dialling a codenumber a number already dialled digits (Nx) is counted and is compared with a defined number of digits to be dialled. If this number is reached, a timer (Tx) is started and during the runtime of the timer it is detected whether further digits are dialled. If further digits are dialled the timer is restated at every detection. If no further digit is detected, after time out of the timer a query is launched. Alternatively after launching a first query it is possible to analyse the already dialled number of digits and to define a number of digits to be dialled. If then this number is reached a timer is started and the further method is processed.

20 Claims, 10 Drawing Sheets

FIG. I
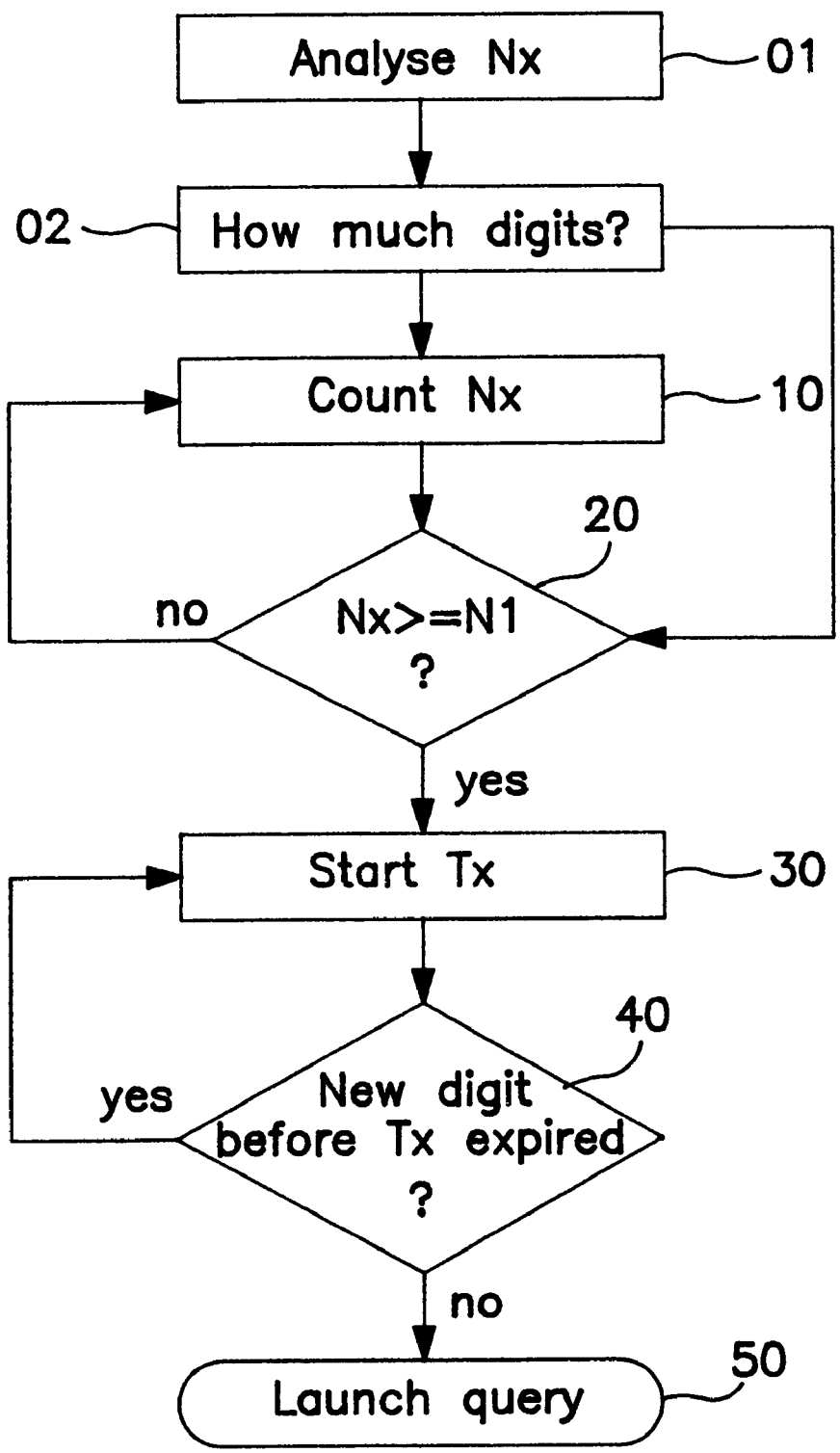

FIG. 4A
FIG. 4B
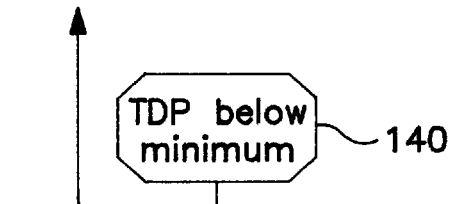
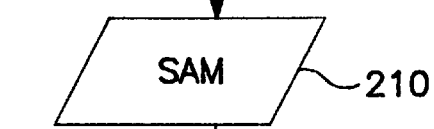
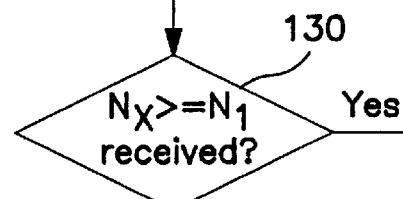
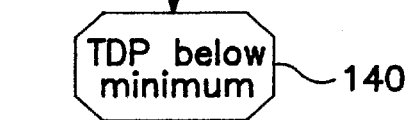
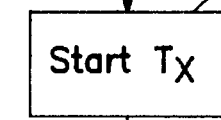
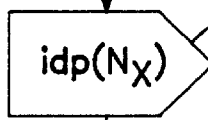
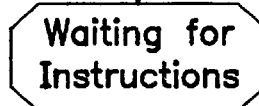

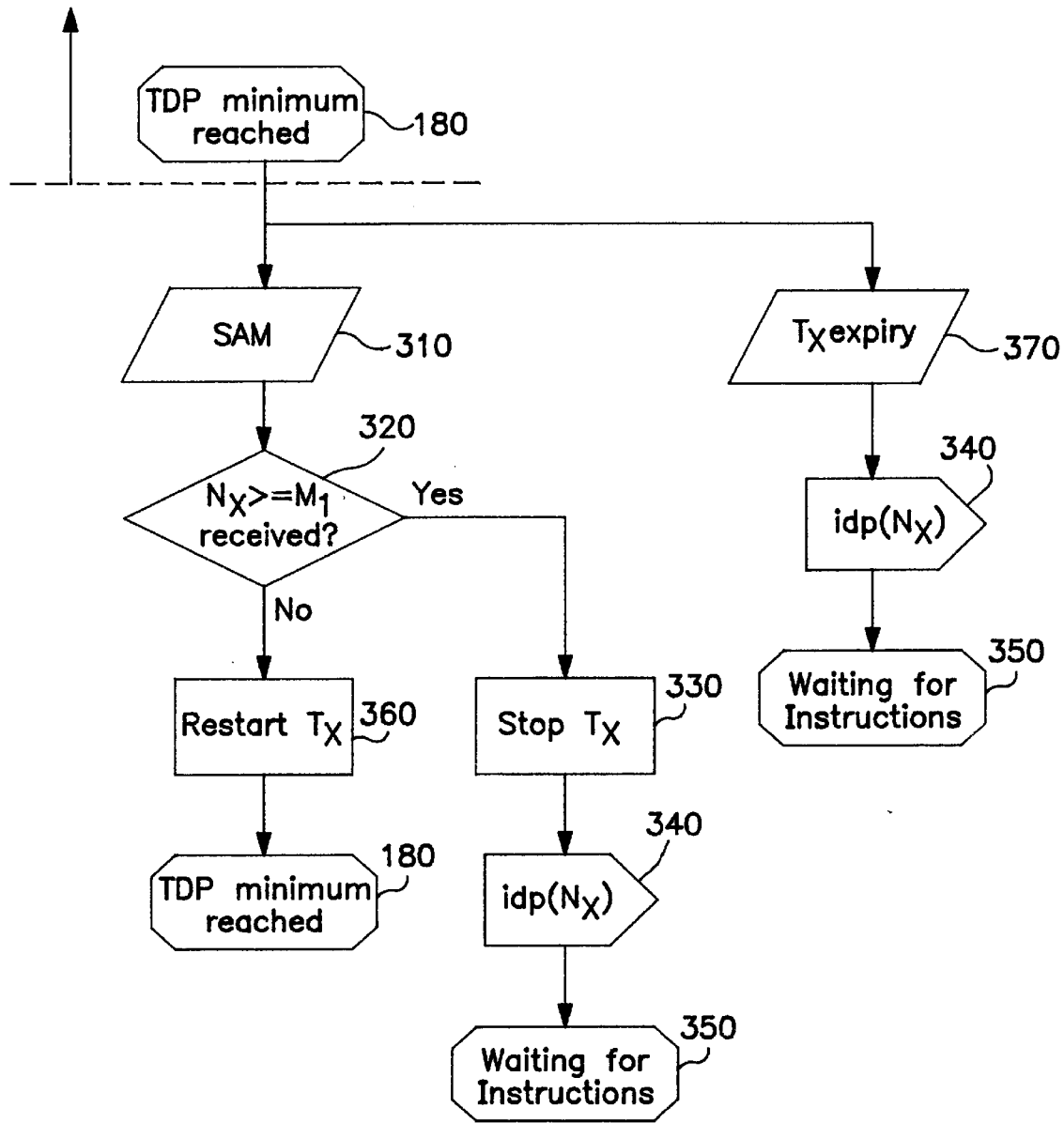

METHOD AND SYSTEM FOR DETECTING THE STATE OF DIALING A CODENUMBER

BACKGROUND

The invention relates to a method and a system for detecting the state of dialling a codenumber. Especially the invention relates to a method and a system in the environment of number analysis relating to dialling in the environment of cellular telecommunication or intelligent networks.

In the prior art U.S. Pat. No. 4,658,096 there is described an interfacing system for interfacing a standard telephone set with a wireless telephone set with a wireless radio transceiver. The system automatically determines when the last digit has been dialled to thus provide a send signal for ultimate transmission. To determine when the last digit of a telephone number has been dialled, the system looks at various initial digits of the telephone number if a 0 or 1 is located in the first few digits. It has to be taken into consideration that a US system is described where the numbers to be dialled are different to European numbers. A logical analysis is conducted from this information. The logical analysis determining for example a 0 at the first digit position leads to assuming that a long distance call will be performed and then seven digits are allowed. Another 0 at the following digits position leads to assuming that an out of area call will be done and a total of 11 (eleven) digits are allowed until a so called SEND code is sent. If an international call is assumed, a SEND code is generated when three seconds gap occurs after a digit is dialled without any minimum number of digits to be dialled, because no exact number of digits to be dialled can be assumed. If no SEND code is sent after three seconds the system counts until 7 digits are dialled and waits for the send code then or if then again no send code is sent, a total of 11 digits are assumed and the system waits for them to occur. This system leads to complicated and time consuming method, because a relatively advanced logic has to be incorporated with an precise analyse of the dialled number and the system always requests the SEND code to start launching of a query which implies. This system further can only be used in the environment of telephony. In, e.g. an intelligent network environment where the length of number and the style of number are not fixed the analysis is not possible.

SUMMARY

It is an object of the present invention to provide a method and a system for detecting the state of dialling a codenumber, which implies a low signalling load and a low delay in call set-up.

The invention is advantageous because a complete codenumber is likely to have been collected until a query is launched, which leads to a low signalling load due to the fact that the codenumber is sent in one go. The invention further leads advantageously to a low delay in call set-up. When a call should be set-up, a timer with a long time period causes a high delay when the codenumber is finally dialled due to the fact that the timer period is the minimum time it has to be waiting for. Such a time may be too long and may lead to an unacceptable waiting timer for a user who wishes to have a connection as soon as possible after finishing dialling. On the other hand if the timer's time period is too short this may lead, depending on the dialling speed to an unsuccessful set up of a call.

It is further advantageous that an analysis of the codenumber of dialled digits is performed. The analysis leads to a minimum number of digits to be dialled and after this number of digits is reached a timer starts. This leads to a better estimation of the number of digits, which have to be dialled in minimum, and therefore a low delay of call set-up is reached.

It is advantageous that the time period of the timer is determined depending on the average dialling speed of a dialler. Depending on different circumstances a dialler dials quicker or slower. Further the dialling speed is also depending on the person dialling. Therefore it is advantageous to have a short time period for people dialling quickly and to have a longer time period for people dialling slower.

Therefore any dialler has its individual time period and therefore the delay of call set up is also depending on it.

It is advantageous to define a maximum number of digits to be dialled. If the maximum number of digits is reached before the timer expired the query can be initialised directly without waiting. This further leads to a low delay of call set-up.

A timer can be fixed to different time periods wherein the results in a trigger timer and an event timer. It is a matter of fact that a dialler dials the first digits quicker than the last digits. According to this claim this can be solved easily and leads to a more personalised structure depending on the user need and leading to low delay for call set-up.

It is advantageous to have two different timers, out of which one is a trigger timer and one is an event timer. The trigger timer and the event timer may be determined by measuring the average time period between dialling two digits, and setting the time period of the timer to a value slightly longer than the average time. One or both of the timer can also be set to a fixed value. Therefore it may appear that either the event timer is set to a time period shorter, longer or equal to a time period of the trigger timer.

It may be advantageous to have an indication for unknown number length. In this case the numbers of digits to be dialled shouldn't be fixed to a special value, but it should be open how large this number is. This can be indicated by using a prefix or even not fixing the numbers.

BRIEF DESCRIPTION OF THE DRAWINGS

A method and a system of the present invention will be further understood and appreciated from the following detailed description taken into conjunction with the figures. The following figures are showing:

FIG. 1: Flowchart of the invention,

FIG. 4B: Flowchart of trigger detection point below minimum,

FIG. 4C: Flowchart of trigger detection point minimum reached,

DETAILED DESCRIPTION

Figure 2A:
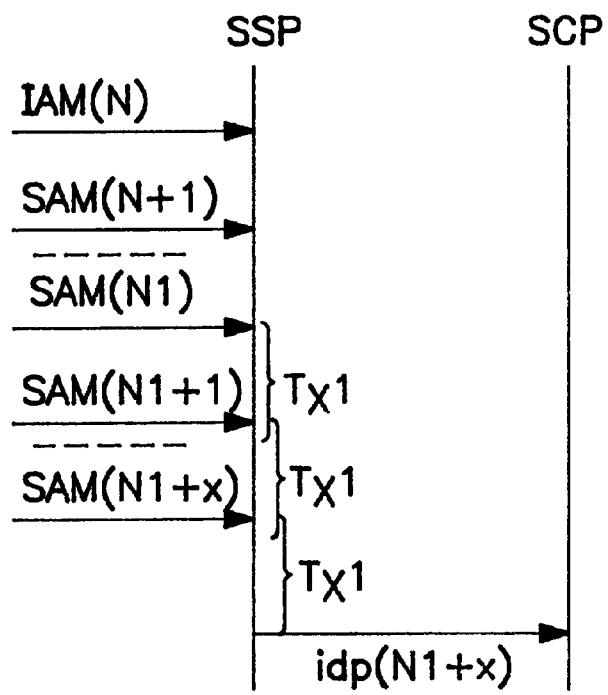
FIG. 2A: Sequence diagram according to claim 1.

In the following the invention will be described in more detail in accordance with FIG. 1.

In a method for detecting the state of dialling a codenumber, in a first step 10 a number Nx,Nx+1, . . . of dialling digits is counted. The counted number Nx,Nx+1, . . . of dialled digits is in a next step 20 compared with a defined number N1 of digits to be dialled. If the counted number Nx,Nx+1, . . . is at least as big as the defined number N1 of digits in a next step 30 a timer Tx is started. If the counted number Nx,Nx+1, . . . of digits is smaller then the defined number N1 of digits to be dialled, no further action is started beside that the step 10 of counting the number Nx of already dialled digits is started again.

The timer Tx is started and runs a time period, which is defined. Preferably the time period the timer Tx runs is short. Short in this case means that the timer Tx is only a little bit longer than the average time between dialling two digits of a codenumber. The average time can be estimated, and advantageously the time period between dialling two digits is measured and then the time period of the timer Tx is set to a value longer than the measured average time.

In a next step 40 it is detected if a new digit N1+x is dialled before the time period of the timer expired. If there is a new digit N1+x dialled the timer Tx is started again from the beginning. With every dialling of a new digit N1+x the timer Tx will be started. anew. If the time period of the timer Tx is expired and no new digit is dialled, finally a query is launched—see step 50.

As already mentioned before, there is a defined number of digits N1 which have to be reached before the timer Tx is started. This number is e.g. a minimum number of digits to be dialled. If we are talking about codenumbers in the background of telephony the minimum number may possibly be 6 digits, because every phone number is longer than 6 digits. If we are talking about codenumbers, which are telephone numbers used for mobile telephony, you may e.g. have as a minimum number of digits 7 or 8 or even more as along as you will always dial the area code as well.

Further to the method described above, in addition an analysis of the dialled digits Nx can be performed—step 01. The analysis determines how many digits are needed and sets the defined number of digits to be dialled N1 to ist value N1=N2—step 02. An analysis can be performed by analysing the first dialled digits. If e.g. it is analysed that there is a first zero dialled it is known that there is a minimum number, which has to be dialled. If the analysis of the first two digits is performed and e.g. another zero is detected, it is known that another minimum number of digits have to be dialled. It has also to be defined how many digits will be analysed and advantageously the first two digits have to be analysed. The method of analysing dialled digits is already well known and depends on a national number structure. The analysis is only used to estimate the possible number of digits and doesn't give this number exactly, but may reach the exact number. If the number is exactly reached and no further digit is needed, it is possible to launch the query directly (not shown in the figure). This is described in more detail later.

In addition, if the number Nx,Nx+1, . . . of dialled digits is as big as the defined number of digits N1, a query can be launched directly. Further to this the timer Tx is started and it is detected whether an additional digit N1+x is dialled. If an additional digit is dialled, the timer Tx is restarted at every appearance.

The method according to claim 3 will be described.

Another method for detecting the state of dialling a codenumber includes the following steps: After a first query is launched an analysis of a dialled number Nx,Nx+1, . . . of digits is performed. For example the first couple of digits are analysed. Depending on the analysis of the dialled digits a number N2 of digits to be dialled is defined. In further steps the number Nx,Nx+1, . . . of dialled digits is counted and the number is compared to the defined number N2. If the counted number of digits is at least as big as the defined number N2 of digits, a timer Tx is started. During the runtime of the timer it is detected whether an additional digit (N2+x) is dialled. If an additional digit is dialled during the runtime of the timer Tx, it is restated at each detection, and if no additional number is dialled, a query with the dialled number of digits is launched at time out.

In the method mentioned above no steps have to be considered until the query is launched for the first time. Therefore the defined number N2 of digits to be dialled always a result of the analysis. However, it is possible according to this method and the method described above in connection with FIG. 1 that the number of the digits to be dialled has an unknown number length. This can be indicated by using a prefix replacing any number N1,N2 of digits to be dialled and not to define a fixed one.

In the following it will be shown in accordance with FIGS. 2A and 2B, which shows a sequence diagram, how the time out of the method works.

Figure 2B:
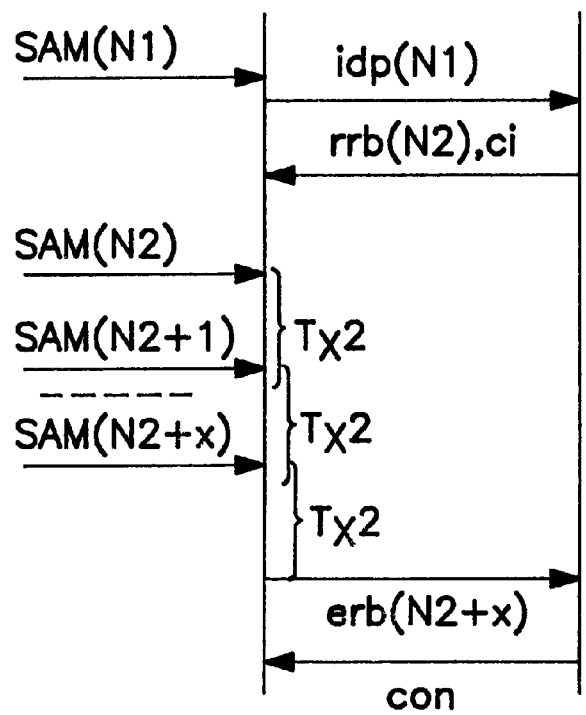
FIG. 2B: Sequence diagram according to claim 2 and 6.

In the FIG. 2A and FIG. 2B the two vertical lines show at the left side the point from where the query is launched and at the right side where the query is launched. In the figures it is exemplary shown as a service switching point SSP from where the query is launched to the next point, a service control point SCP. An initial address message IAM(N) depending on the number N of dialled digits is attached to the service switching point SSP. Depending on the counted number Nx=N of dialled digits, a subsequent address message SAM(N+1) of the additional dialled number Nx=N+1 of digits is attached, as long as the counted number is not equal to the defined number N1. As already mentioned the dialled number of digits Nx is compared to the defined number N1 of digits to be dialled. After the comparison with the defined number N1 of digits to be dialled, after a positive result, a subsequent address message SAM(N1) is attached to the service switching point SSP. A timer Tx1 is started and it is detected whether an additional digit N1+1 is dialled during the runtime of the timer Tx1. Then a subsequent address message SAM(N1+1) is attached to the service switching point SSP. If a dialling of an additional digit N1+1 is detected, the timer Tx1 is started anew. The next detection of a dialled number N1+x, x=2,3, . . . of a digit is performed. At the service switching point SSP a subsequent address message SAM(N1+x) is attached. If there is no digit dialled until the time period if the timer Tx1 expires, and query is launched idp(N1+x) to the service control point SCP.

In the following the FIG. 2B further to FIG. 2A. As already mentioned before, a first query idp(N1) is launched after a defined number of digits to be dialled N1 is reached. In this case the number depends on the analysis. Further digits are needed and a request rrb to collect further information ci is sent from the service control point SCP to the service switching point SSP. The request for further information may include, a new defined value N2 of digits to be dialled, which is sent from the service control point SCP to the service switching poing SSP as a request rrb(N2) for further number N2 of digits to be dialled. Further digits are dialled and a subsequent address message SAM(Nx) depending on the new number Nx digits to be dialled may arrive to the service switching point SSP. If the subsequent address message SAM(N2) reaches the number N2 of the defined number of digits, the timer Tx2 is started. It is advantageous to split the timer Tx which was mentioned before in a trigger timer Tx1 and an event timer Tx2. In the case that a subsequent address message SAM(N2) reaches the number N2 of the defined number of digits, the event timer Tx2 is started. The runtime of the event timer Tx2 may be different depending on the state of dialling, which means either after the first analysing or the second or further analysing. E.g. the timer Tx2 may be longer after launching the query for the first time and requesting additional information, because the dialling speed at the end of dialling a number may be slower. However, it may also be applicable that the trigger timer Tx1 equal to the event timer Tx2.

During the runtime of the event timer Tx2 it is detected whether further digits N2+x, x=1,2,3 . . . are dialled. After the time period of the timer Tx2 has expired and no further digits N2+x have been dialled, a query erb(N2+x) is launched from the service switching point SSP to the service control point SCP. If the codenumber can be finally executed, a message con is sent from the service control point SCP to the service switching point SSP to finish the process of selecting the state of dialling a number.

Figure 3A:
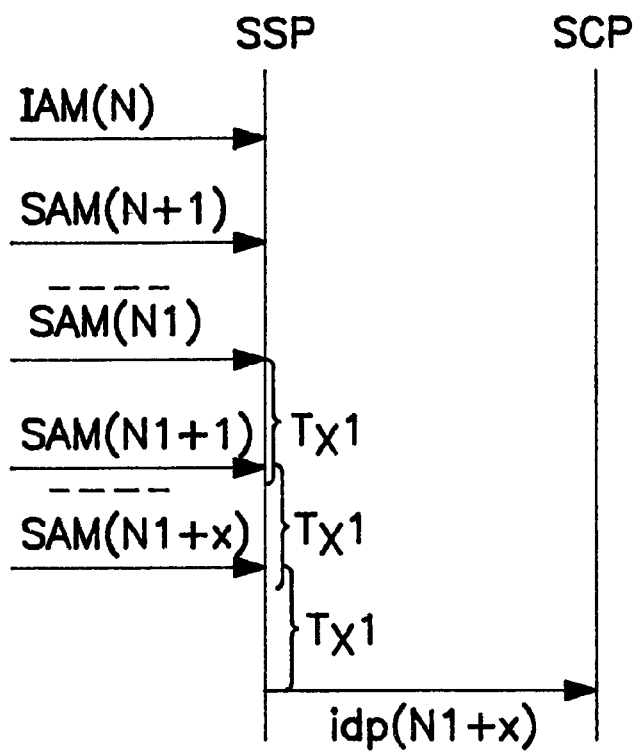
FIG. 3A and 3B: Sequence diagram according to claim 5.
Figure 3B:
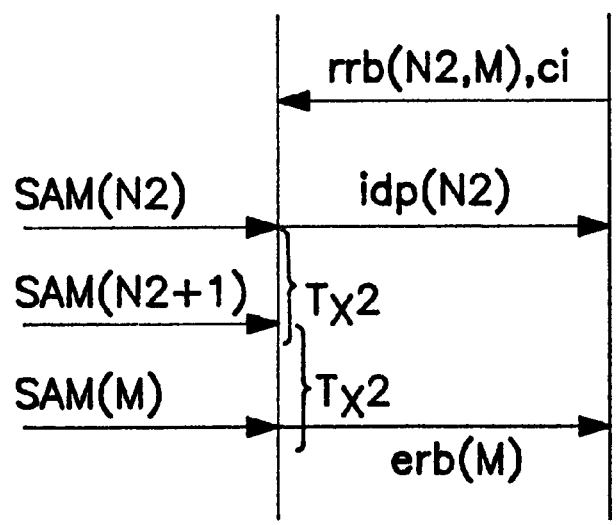

In the following FIG. 3A and FIG. 3B will be described. Until the first launching of a query idp(N1+x) from the service switching point SSP to the service control point SCP, here the same applies as for the description of FIGS. 2A and 2B. Therefore FIG. 3A shows the same as FIG. 2A. After launching the first query, a request rrb(N2,M) for collecting additional information ci is sent from the service control point SCP to the service switching point SSP. As already mentioned before a new number N2 of digits to be dialled is requested. In addition to this a maximum number M of digits to be dialled is defined. The maximum number M of digits to be dialled may be a result of an analysis as well. At the service switching point SSP a subsequent address message SAM(N2) carrying the number N2 of digits to be dialled arrives. If the new number N2 of digits to be dialled is reached, a timer Tx is started. During the runtime of the timer Tx it is detected whether an additional digits N2+1, . . . ,N2+x is dialled and the number is compared to a maximum Number M of digit to be dialled. If an additional dialled digit is detected the timer Tx is started anew. If now new digit is dialled during the runtime of the timer Tx and the number of dialled digits N2+x is as big as the maximum number M, immediately a query erb(M) is launched without waiting for the timer Tx to expire. This results in a low delay because the service switching poing SSP does not wait for the timer to expire due to the fact that it is sure that a maximum number M of dialled digit results in a sufficient number.

In the following the invention will be further described in the environment of number portability. In general number portability is a network capability that gives a subscriber the ability to change their local service without having to change the corresponding directory number. In the environment of Local Number Portability LNP new B-number analysis tables, similar to existing B-number analysis tables, need to be used for routing calls after local number portability has been done. These tables have to be separate tables from the normal B-number analysis table. The invention shall apply to services with variable B-number length, such as the local number portability. In the following FIG. 4A will be described showing a flowchart, which shows the detection of the state of dialling a codenumber. In a first step 110 there is no digit dialled, which is indicated with NULL. In a next step 120 an initial address message IAM is launched. This can also be inicated as a Set-up message. In a next step 130 it is detected whether a dialled digit Nx is received, which is at least as big as a defined number of digits N1 to be dialled. If the number Nx of dialled digits is not at least as big as the defined number, it is defined that a trigger detection point TDP is below minimum—step 140. If the number Nx of dialled digits is bigger than the defined number N1, it is checked whether the number Nx is at least as a maximum number M, step 160. If it is not bigger than the maximum number M, which gives the secure number of digits to be dialled and implies that a whole codenumber is dialled, a timer is stared in a next step 170, before the trigger detection point TDP is finally reached in step 180. If it is bigger than the maximum number M, a query idp including the number of dialled digit idp(Nx) is launched in a step 190 and the service switching point is finally waiting for instructions, step 199.

If according to step 140 the trigger detection point TDP is below minimum, it is further shown in FIG. 4B, that in a next step 210 a message SAM with subsequent information arrives. In a next step 130 it is again detected whether the number of dialled digits Nx is at least as big as the defined number of digits. If this results in 'no', the trigger detection point TDP is still below minimum step 140. If the result is 'yes' the same steps 160 et al as described according to FIG. 4A are executed.

Figure 4A:
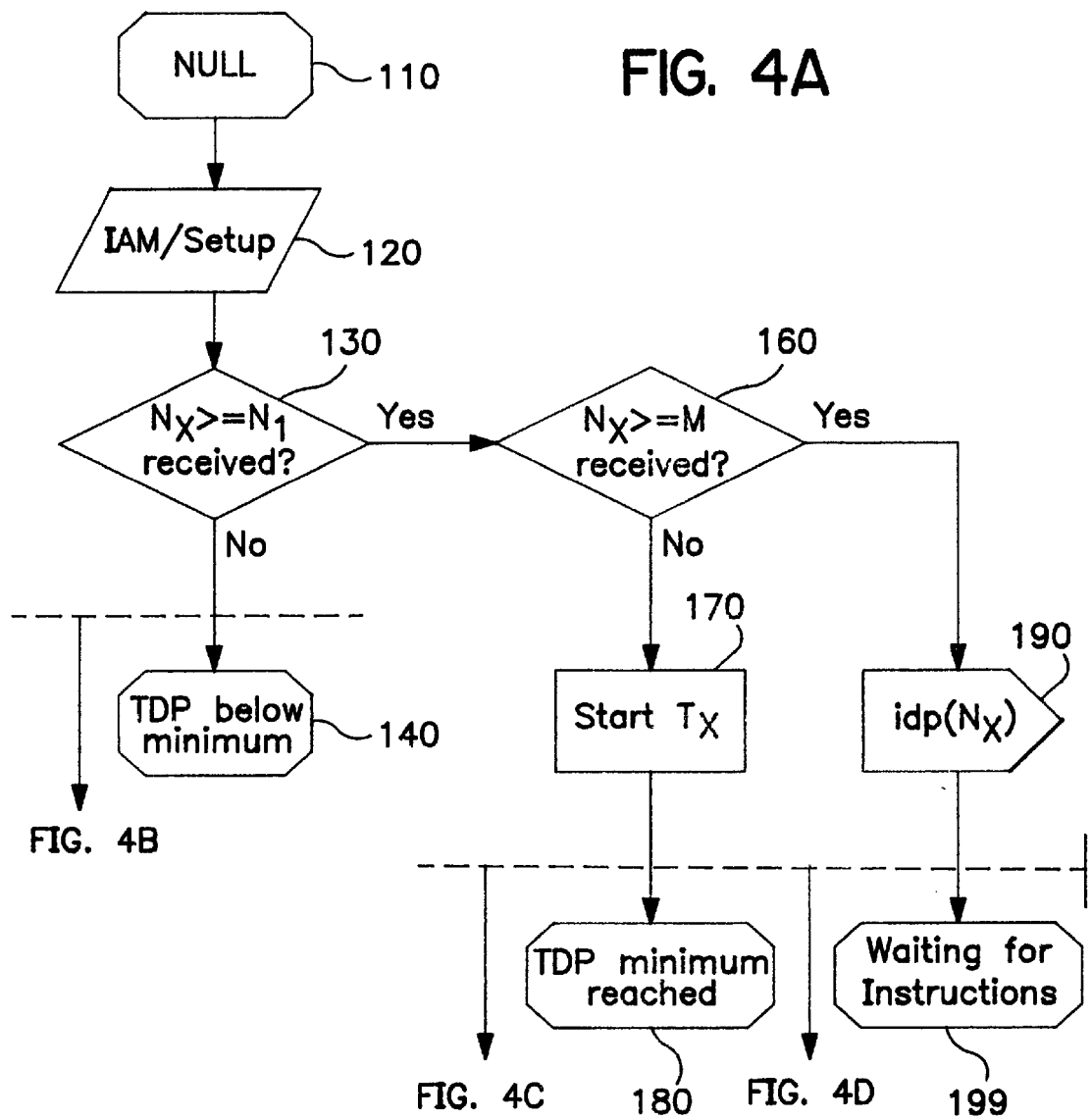
FIG. 4A: Flowchart of the method.

In FIG. 4C, following FIG. 4A at the step 180 where the trigger detection point TDP minimum is reached, in a next step 310, a subsequent address message SAM arrives. If in a next step 320 the number of dialled digits Nx is at least as big as the maximum number M, the timer Tx is stopped, step 330. Then the query including the actual number of dialled digit idp(Nx) is launched immediately. After the launching the service switching point SSP waits for instruction according to step 350. This means it is waiting for further instructions provided by the system.

If the number of dialled digits Nx is not as big as the maximum number M, the timer Tx is restarted—step 360 and finally the result is that the trigger detection point TDP minimum is reached, step 180.

Another way after the step 180 of result that the trigger detection point TDP minimum is reached is to check whether the time period of the timer Tx is expired, see step 370. If it is expired, the query including the actual number of dialled digits idp(Nx) is launched, see step 340 and in addition it is waiting for further instructions—step 350.

Figure 4D:
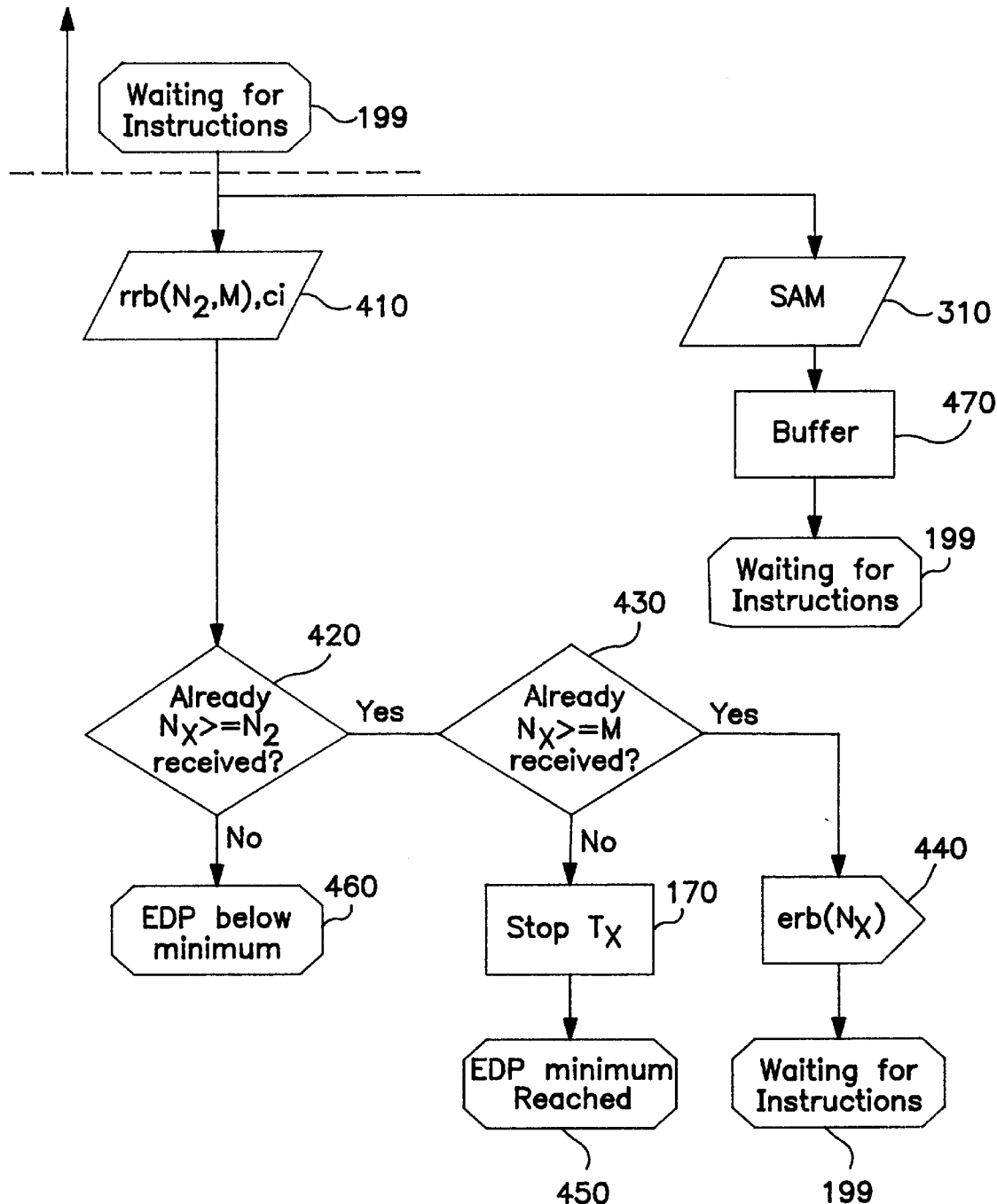
FIG. 4D: Flowchart of waiting for instructions.

According to step 199, the next step is waiting for instructions. As shown in FIG. 4D, in an additional step 410, a request rrb(N2,M) for collecting additional information ci is sent. The request rrb(N2,M) for additional information ci includes a new defined number N2 of digit, which have to be dialled before a new query is launched. In addition a maximum number M may be send with the request rrb(N2,M) to give the maximum number of digits which have to be dialled under the circumstances that it is sure that a complete codenumber exists. If it is detected in a step 420 that the number Nx of dialled digits is at least as big as the new defined number of digits to be dialled, it is in addition checked whether the number Nx of dialled digits is at least as big as a maximum number M, step 430. If the result is yes, a query erb(Nx) is launched directly—step 440—and the next step is waiting for instructions—step 199. If the result is 'no' the timer Tx is started again, see step 170, due to the fact that no complete codenumber is available and it has to wait for further digits, which is indicated as step 450 a so called event detection point EDP minimum reached, indicating that the defined number of digits are dialled, but additional digits are necessary to get all digits of the complete codenumber. If the dialled number Nx of digits are smaller than the number of defined digits which have to be dialled until a query is launched, it is indicated with step 460 that the event detection point EDP is below minimum.

As already mentioned the next step is, according to step 199, waiting for instructions. In addition, a subsequent address message SAM is launched, step 310 and the digits are buffered, step 470, and the further step is waiting for instructions until further actions occur.

Figure 5A:
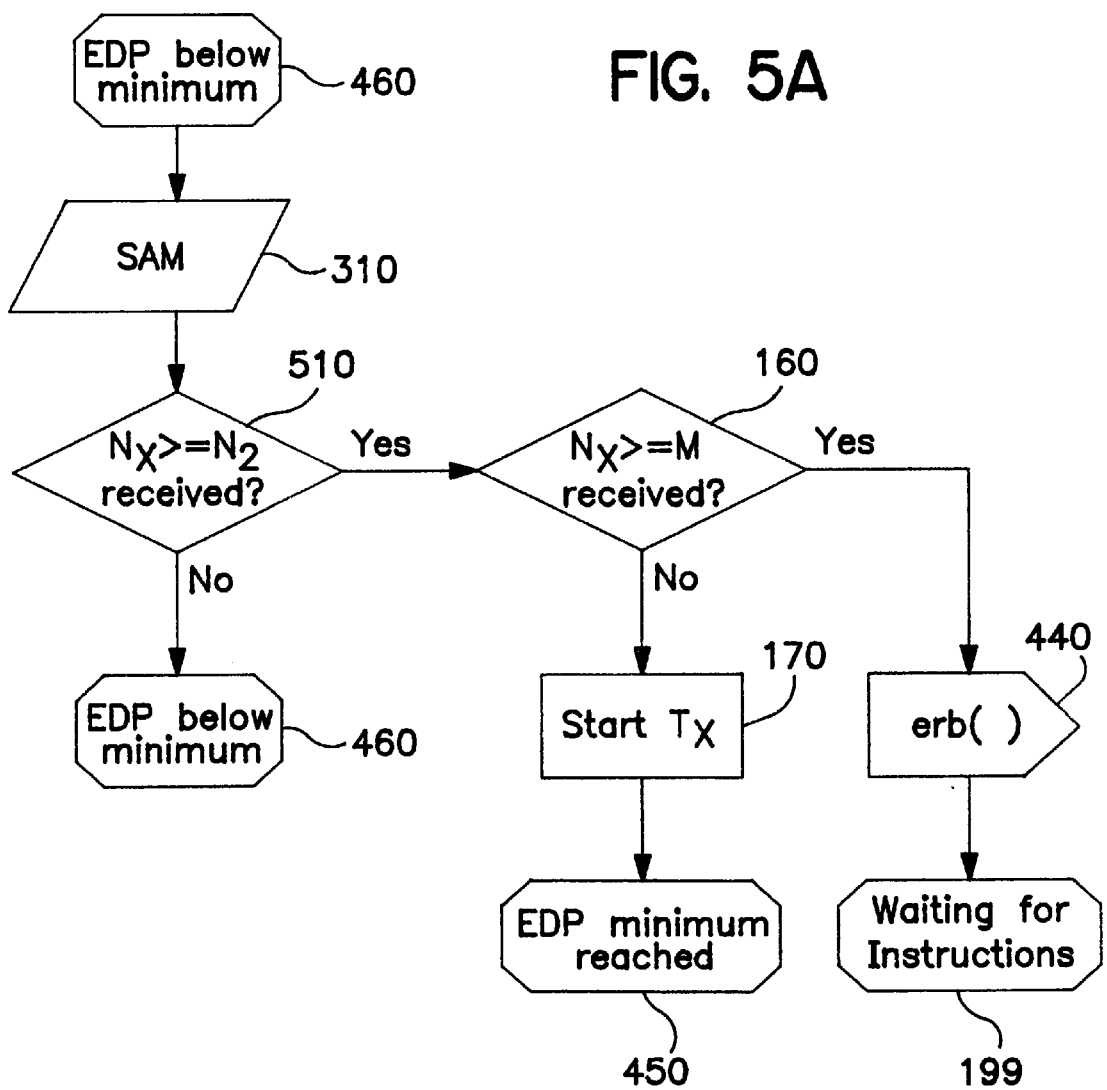
FIG. 5A: Flowchart of event detection point below minimum.
Figure 5B:
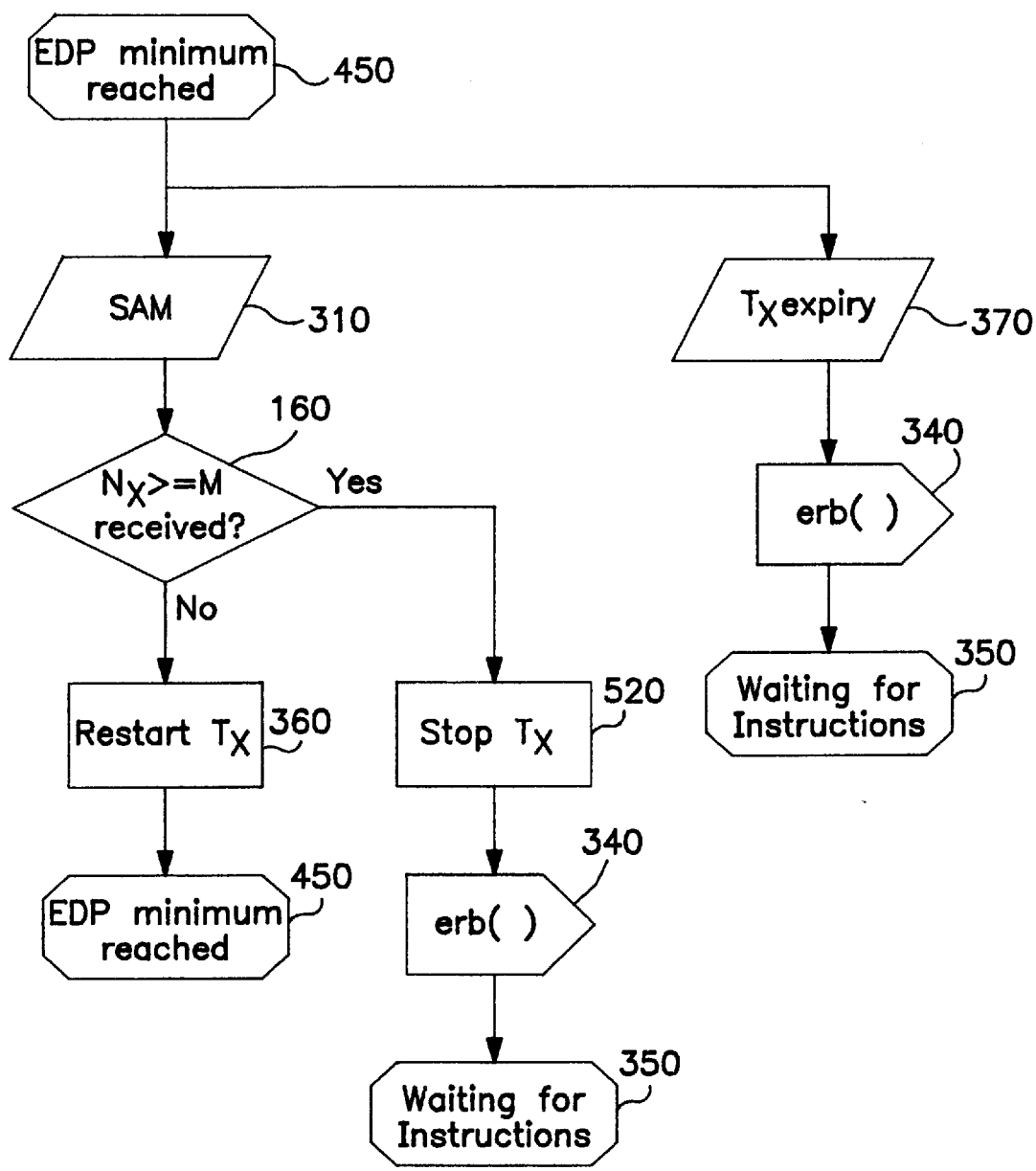
FIG. 5B: Flowchart of event detection point minimum reached.

In the following FIGS. 5A and 5B will be described in more detail.

As mentioned according to FIG. 4D, there is a step 460 indicating that the event detection point EDP is below minimum. According to FIG. 5A a subsequent address message SAM is received and in addition it is detected, step 510, whether the number of dialled digits Nx are at least as big as the new defined number N2 of digits to be dialled. If the detection result is still negative it occurs that the event detection point EDP is still below minimum—step 460, due to the fact that there are not enough digits dialled. If the number Nx of dialled digits is at least as big as the new defined number, it is further checked whether it is as big as a maximum number, step 160. If the result is negative a timer Tx is started, step 170, because more digits are needed. This is done until the event detection point EDP has reached a minimum, step 450. If the number Nx of dialled digits is as big as a maximum number, a query erb(Nx) is launched immediately, step 440 and the next step is waiting for instructions, step 199.

If the event detection point minimum is reached, step 450, either it is checked if the time period of the timer expires, step 370, or a subsequent address message SAM may arrive, step 310, and it is further checked whether the number of dialled digits is at least as big as the maximum number M of digits to be dialled, step 160. If after the detection that the event detection point minimum is reached it is further checked that the time period of the timer is expired, a query erb(Nx) is launched, step 340. The next step is waiting for instructions, step 350.

If it is detected that the number of digits Nx is at least as big as the maximum number, the timer Tx is stopped, step 520, and a query erb(Nx) is launched immediately, step 350 and the next step is waiting for instructions, step 350. If the number Nx of dialled digits in not as big as the maximum number M of digit, the timer Tx is restarted, step 360 and it is further processed with the step event detection point minimum is reached, step 450.

As mentioned before, the timer Tx runs a time period. The time period can be defined and should meet some requirements. If the time period is too long this will cause a long delay before the codenumber is finally executed or if the time period is too short, a query is finally launched even when there are some further digits which are needed for the analysis. To define a suitable time period, the time between dialling two digits can be measured and the time period of the timer can be defined to be a little bit longer than the average time between dialling two digits. It further has to be taken into consideration that usually dialling of the first digits is quicker than dialling of the last digits.

In addition to the method where a defined number of digits is set twice, it is advantageous to define different time periods of the timer, e.g. to take the changing dialling speed into consideration. The time periods of the timer Tx is first set to a longer value than later.

Figure 6:
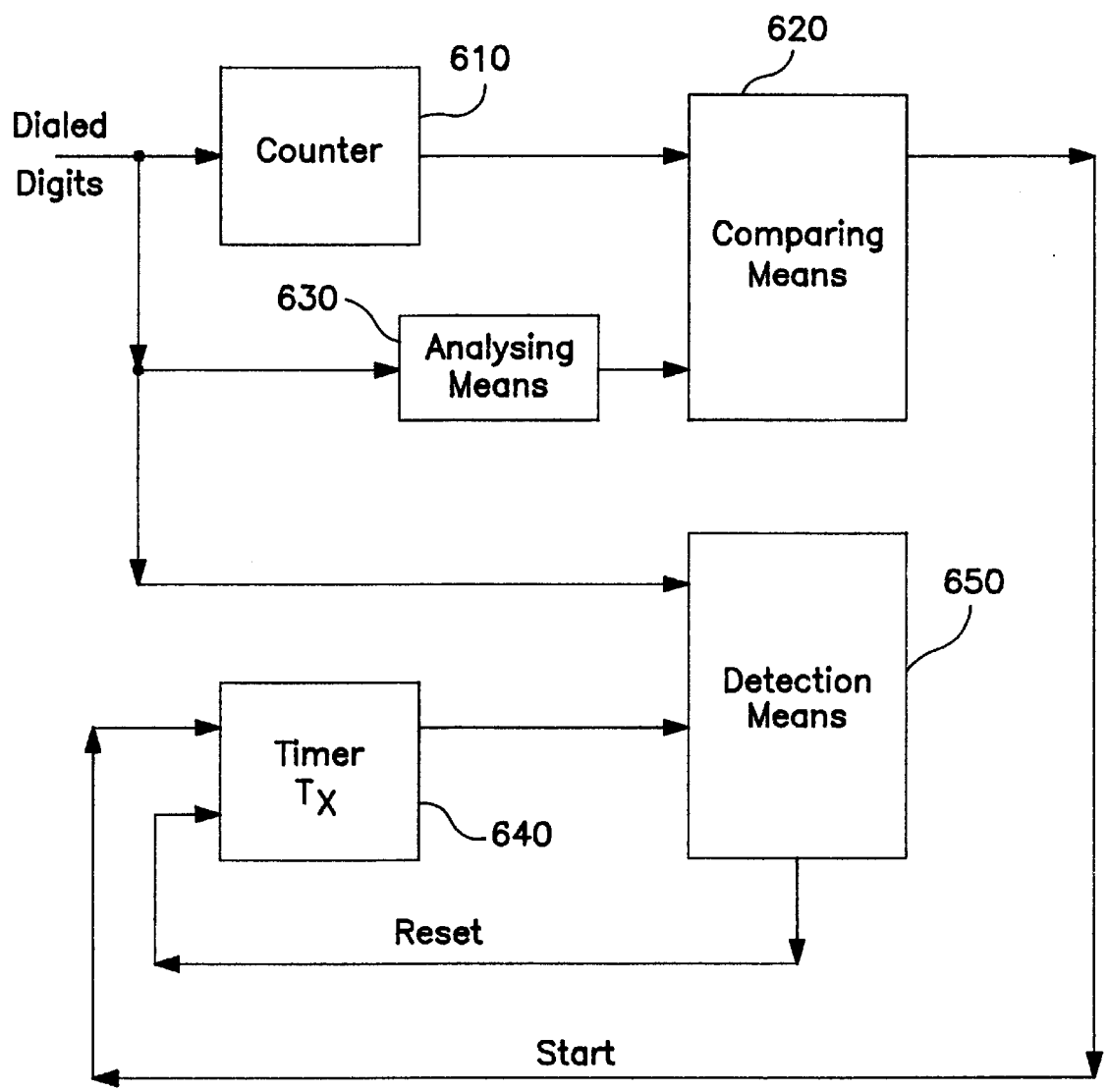
FIG. 6 illustrates an exemplary apparatus in accordance with the present invention.

In the following a system for detecting the state of dialling a codenumber is described in connection with FIG. 6.

A system for detecting includes a counter 610 for counting a number Nx,Nx+1, . . . of dialled digits. Further there are comparing means 620 to compare the counted number Nx,Nx+1, . . . with a defined number N1 of digits to be dialled. The defined number N1 of digits is given and set to a fixed value for all cases or it is set to a value corresponding to the analysis of already dialled digits. Additional analysing means 630 can be provided, which are analysing the already dialled digits in the way as already mentioned before. Then the analysing means 630 give a defined value N1,N2 of the system. Further there is a timer Tx 640 included into the system. The timer 640 executes a defined and given time period. In addition there are detection means 650 to detect whether additional digits N1+x were dialled during the runtime of the timer Tx 640. The detection means 650 are detecting any occurences of a newly dialled digit. At any occurrence of a newly dialled digit the timer tx 640 is reset and starts running again.

In the following a possible use of the method and system according to the invention will be described to make the invention more clear.

As already mentioned the method and system can be used to provide a service for local number portability calls, where the signalling should not be high while having a low delay in set up of a call. However, a further use can be seen in the whole environment of intelligent network. Intelligent networks are a telecommunication concept for advanced services within existing telephony network. The need for further services within existing network is growing, and therefore any service where the detection of the state of dialling a codenumber is needed is affected by this invention.

A further preferred use is in the field of in the environment of intelligent peripherals to implement local number portability. An intelligent peripheral is a device, possilby including a computer or being connected to one, which is able to create and run services belonging to the field of intelligent networks, but doesn't fulfil all requirements necessary to built up an intelligent network.

Further it should be mentioned that the codenumber may be any sort of number, and should not only be restricted to telephone numbers.

The way of dialling a codenumber is not described in more details, due to the fact that it doesn't affect the invention, but it should be mentioned that any way of dialling, either voice dialling, tone dialling, etc is one possible way of dialling.

What is claimed is:

1. Method for detecting the state of dialling a codenumber comprising the steps of:

counting a number of dialled digits of the codenumber;

comparing the counted number of digits with a defined number of digits to be dialled;

starting a timer if the counted number of digits is equal to or greater than the defined number of digits, wherein the timer is not started until more than one digit is dialled;

detecting if an additional digit is dialled during runtime of the timer;

if an additional digit is dialled, restarting the timer at each detection of the additional digit, and if no additional digit is dialled, launching a query with the dialled number of digits when the timer has time out.

2. Method according to claim 1, further comprising the steps of:

analysing the dialled number of digits; and determining a minimum number of digits, which have to be dialled depending on the analysis and launching of first query.

3. Method according to claim 2, wherein a result of the analysing step is either an exact number length or is an unknown number length, defining a minimum number of digits which have always to be dialled.

4. Method according to claim 1, wherein an average time between dialling two digits is measured and the time of the timer is set to a value longer than the average dialling time between the two digits.

5. Method according to claim 1, further comprising the steps of:

defining a maximum number of digits to be dialled;

calculating if the total number of digits dialled is equal to or greater than the maximum number; and launching the query immediately if the maximum number is collected.

6. Method according to claim 1, further comprising the steps of:

analysing the dialled number of digits after launching the query; and determining another number of digits to be dialled.

7. Method according to claim 1, wherein the timer is set to different time periods resulting in a trigger timer and an event timer.

8. Method according to claim 7, further comprising the steps of:

determining the time period of the timer by measuring an average time between dialling two digits; and setting time of the timer to a value longer than the average dialling time between dialling the two digits.

9. The method according to claim 1, wherein the codenumber is a local number portability number.

10. Method according to claim 2, wherein the analysis of the received number of digits in the first query results in no exact number length, and where the timer is started immediately.

11. System for detecting the state of dialling a codenumber, comprising:

a counter for counting a number of dialled digits;

comparing means to compare the counted number with a defined number of digits to be dialled;

a timer; and detection means to detect whether additional digits were dialled during the runtime of the timer, wherein the timer is not started until more than one digit is dialled.

12. System according to claim 11, further comprising:

analysing means to analyse the dialled number.

13. According to claim 11, wherein the system is an intelligent peripheral which implements local number portability.

14. The system according to claim 11, wherein the system is in an intelligent network which implements local number portability.

15. Method for detecting the state of dialling a codenumber comprising the steps of:

analysing the dialled number of digits after launching a first query;

defining a minimum number of digits to be dialled;

counting the number of dialled digits;

starting of a timer if the counted number of digits is at least as big as the defined minimum number of digits, wherein the timer is not started until more than one digit is dialled;

detecting if an additional digit is dialled during the runtime of the timer; and if an additional digit is dialled, restarting the timer at each detection of the additional digit, and if no additional number is dialled, launch a query with the dialled number of digits at time out.

16. Method according to claim 3, wherein an average time between dialling two digits is measured and the time of the timer is set to a value longer than the average dialling time between the two digits.

17. Method according to claim 15, further comprising the steps of:

defining a maximum number of digits to be dialled;

calculating if the total number of digits dialled is equal to or greater than the maximum number; and launching the query immediately if the maximum number is collected.

18. Method according to claim 15, further comprising the steps of:

analysing the dialled number of digits after launching the query; and determining another number of digits to be dialled.

19. Method according to claim 15, wherein the timer is set to different time periods resulting in a trigger timer and an event timer.

20. Method according to claim 19, further comprising the steps of:

determining the time period of the timer by measuring an average time between dialling two digits; and setting time of the timer to a value longer than the average dialling time between dialling the two digits.

* * * * *